United States Patent
Marks et al.

(10) Patent No.: US 10,853,110 B2
(45) Date of Patent: Dec. 1, 2020

(54) CONSTRUCTOR ACCESSIBILITY CHECKS FOR DESERIALIZATION

(71) Applicant: Oracle International Corporation, Redwood Shores, CA (US)

(72) Inventors: Stuart Warren Marks, Mountain View, CA (US); Alan Bateman, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 165 days.

(21) Appl. No.: 16/227,290

(22) Filed: Dec. 20, 2018

(65) Prior Publication Data

US 2020/0019423 A1    Jan. 16, 2020

Related U.S. Application Data

(60) Provisional application No. 62/697,159, filed on Jul. 12, 2018.

(51) Int. Cl.
| | | |
|---|---|---|
| G06F 9/455 | (2018.01) | |
| G06F 9/448 | (2018.01) | |
| G06F 9/54 | (2006.01) | |
| G06F 8/41 | (2018.01) | |

(52) U.S. Cl.
CPC .......... *G06F 9/45525* (2013.01); *G06F 8/443* (2013.01); *G06F 9/4493* (2018.02); *G06F 9/548* (2013.01)

(58) Field of Classification Search
CPC .......................... G06F 9/4493; G06F 9/45525
See application file for complete search history.

(56) References Cited

U.S. PATENT DOCUMENTS

| | | | | |
|---|---|---|---|---|
| 6,292,933 B1* | 9/2001 | Bahrs | ................... | H02M 3/285 707/999.202 |
| 6,356,946 B1* | 3/2002 | Clegg | .................... | G06F 9/465 709/231 |
| 6,438,594 B1* | 8/2002 | Bowman-Amuah | ....................... | G06F 9/4488 709/225 |
| 6,928,488 B1* | 8/2005 | de Jong | ................ | G06F 9/4493 709/246 |
| 7,150,004 B2* | 12/2006 | Russell | ................ | G06F 9/4493 717/118 |

(Continued)

OTHER PUBLICATIONS

Denaro, Giovanni, and Leonardo Mariani. "Towards testing and analysis of systems that use serialization." Electronic Notes in Theoretical Computer Science 116 (2005): 171-184. (Year: 2005).*

(Continued)

*Primary Examiner* — Matthew J Brophy
(74) *Attorney, Agent, or Firm* — Invoke

(57) ABSTRACT

Techniques for performing constructor accessibility checks during deserialization are disclosed. A system receives a command that requires deserializing a serialized object of a target type. The system determines an ancestor type of the target type. Without calling any constructors and regardless of whether the ancestor type is serializable, the system determines whether a constructor of the ancestor type is accessible to the target type. The system deserializes the serialized object only after determining that the constructor of the ancestor type is accessible to the target type.

20 Claims, 9 Drawing Sheets

(56) References Cited

U.S. PATENT DOCUMENTS

| | | | | |
|---|---|---|---|---|
| 7,207,002 | B2* | 4/2007 | Mireku | G06F 40/197 715/234 |
| 7,246,358 | B2* | 7/2007 | Chinnici | G06F 9/547 719/313 |
| 7,415,704 | B2* | 8/2008 | Schmidt | G06F 9/4488 717/166 |
| 7,539,688 | B2* | 5/2009 | Sezgin | G06F 7/00 |
| 7,614,045 | B2* | 11/2009 | Kuck | G06F 9/544 717/162 |
| 7,730,099 | B2* | 6/2010 | George | G06F 16/289 707/796 |
| 7,814,124 | B1* | 10/2010 | de Jong | G06F 9/4493 707/798 |
| 8,191,040 | B2* | 5/2012 | Hejlsberg | G06F 9/4488 717/114 |
| 10,120,777 | B1* | 11/2018 | Hegarty | G06F 9/46 |
| 10,140,119 | B2* | 11/2018 | Hegarty | G06F 8/71 |
| 10,367,822 | B2* | 7/2019 | Buckley | G06F 8/315 |
| 2003/0145315 | A1* | 7/2003 | Aro | G06F 9/547 717/170 |
| 2003/0191803 | A1* | 10/2003 | Chinnici | H04L 29/06 709/203 |
| 2004/0039964 | A1* | 2/2004 | Russell | G06F 9/4493 714/25 |
| 2004/0064825 | A1* | 4/2004 | Lim | G06F 9/4493 719/319 |
| 2004/0064826 | A1* | 4/2004 | Lim | G06F 9/465 719/319 |
| 2005/0071809 | A1* | 3/2005 | Pulley | G06F 9/4488 717/108 |
| 2005/0246716 | A1* | 11/2005 | Smith | G06F 9/541 719/315 |
| 2005/0262181 | A1* | 11/2005 | Schmidt | G06F 9/5033 709/200 |
| 2005/0262493 | A1* | 11/2005 | Schmidt | G06F 9/4488 717/164 |
| 2005/0262512 | A1* | 11/2005 | Schmidt | G06F 9/5027 719/310 |
| 2006/0070051 | A1* | 3/2006 | Kuck | G06F 9/544 717/162 |
| 2007/0050399 | A1* | 3/2007 | George | G06F 16/289 |
| 2008/0216052 | A1* | 9/2008 | Hejlsberg | G06F 9/44 717/114 |
| 2009/0024987 | A1* | 1/2009 | Forster | G06F 9/4493 717/141 |
| 2011/0289141 | A1* | 11/2011 | Pletter | H04L 67/10 709/203 |
| 2013/0110882 | A1* | 5/2013 | Rudwick, III | G06F 9/4493 707/792 |
| 2017/0269929 | A1* | 9/2017 | Hegarty | G06F 8/71 |
| 2018/0268158 | A1* | 9/2018 | Bateman | G06F 21/629 |
| 2018/0314451 | A1* | 11/2018 | Ellison | G06F 9/4493 |
| 2019/0028483 | A1* | 1/2019 | Buckley | G06F 21/629 |
| 2020/0012503 | A1* | 1/2020 | Ellison | G06F 9/4493 |

OTHER PUBLICATIONS

Gligoric, Milos, Darko Marinov, and Sam Kamin. "CoDeSe: fast deserialization via code generation." Proceedings of the 2011 International Symposium on Software Testing and Analysis. 2011. (Year: 2011).*

Gosling, James, et al. The Java Language Specification (Java SE 8 Edition).(2015). (Year: 2015).*

* cited by examiner

```
private boolean superHasAccessibleConstructor(Class<?> cl) {
    Class<?> superCl = cl.getSuperclass();
    assert Serializable.class.isAssignableFrom(cl);
    assert superCl != null;
    if (packageEquals(cl, superCl)) {
        // accessible if any non-private constructor is found
        for (Constructor<?> ctor : superCl.getDeclaredConstructors()) {
            if ((ctor.getModifiers() & Modifier.PRIVATE) == 0) {
                return true;
            }
        }
        return false;
    } else {
        // accessible if parent is public and any constructor
        // is protected or public
        if ((superCl.getModifiers() & Modifier.PUBLIC) == 0) {
            return false;
        }
        for (Constructor<?> ctor : superCl.getDeclaredConstructors()) {
            if ((ctor.getModifiers() & (Modifier.PROTECTED |
                                        Modifier.PUBLIC)) != 0) {
                return true;
            }
        }
        return false;
    }
}
```

```
public final Constructor<?> newConstructorForSerialization(Class<?> cl)
{
    Class<?> initCl = cl;
    while (Serializable.class.isAssignableFrom(initCl)) {
        Class<?> prev = initCl;
        if ((initCl = initCl.getSuperclass()) == null ||
            !superHasAccessibleConstructor(prev)) {
            return null;
        }
    }
    Constructor<?> constructorToCall;
    try {
        constructorToCall = initCl.getDeclaredConstructor();
        int mods = constructorToCall.getModifiers();
        if ((mods & Modifier.PRIVATE) != 0 ||
            ((mods & (Modifier.PUBLIC | Modifier.PROTECTED)) == 0 &&
            !packageEquals(cl, initCl))) {
            return null;
        }
    } catch (NoSuchMethodException ex) {
        return null;
    }
    return generateConstructor(cl, constructorToCall);
}
```

CONSTRUCTOR ACCESSIBILITY CHECKS FOR DESERIALIZATION

BENEFIT CLAIMS; RELATED APPLICATIONS; INCORPORATION BY REFERENCE

This application claims the benefit of U.S. Provisional Patent Application 62/697,159, filed Jul. 12, 2018, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to serialized objects. In particular, the present disclosure relates to deserializing serialized objects.

BACKGROUND

Serialization is the process of generating a form (the "serial" or "serialized" form) of a runtime object that can be stored in a file, database, or some other location. A runtime object is stored in memory. A serialization mechanism converts the runtime object to raw data, which may be referred to as a byte stream or serial byte stream. For example, in the Java programming language, an object may be serialized using the writeObject( ) method of the java.io.ObjectOutputStream class. The raw data may include metadata associated with the object's type, data values stored in the object (e.g., field values), or any other kind of information about the object or combination thereof. Serialization is a recursive process. If the object is a subtype of another type, then the serialization mechanism also serializes information about the object's supertype(s), up to a top-level type in the system of types (e.g., java.lang.Object in a Java environment). If the object references other objects (e.g., as field values), then the serialization mechanism attempts to serialize those objects. The serial byte stream does not include full type definitions (e.g., class files in Java), but includes enough information to reproduce the object by deserialization, provided that the runtime environment that performs deserialization has access to the appropriate type definitions. If the serial form of an object did not include the object's field values, metadata, etc., then deserialization could not fully reproduce that object. The serial byte stream may be stored in persistent storage such as a database or file system. Alternatively or in addition, the serial byte stream may be transmitted from one computer system to another, effectively making runtime objects portable between systems.

A serialization mechanism may maintain a record, sometimes referred to as an "object table," of the runtime objects that have been serialized. For each serialized object, the serialization mechanism stores a unique number and/or other identifier in the object table. The unique identifier that corresponds to an object in the object table may be referred to as a "backref." When the serialization mechanism encounters an object that has already been serialized, rather than create a duplicate copy of the previously serialized object, it records the object's corresponding backref. The serialization mechanism may repeat this process for multiple objects that reference the same object. In this manner, the serialization mechanism serializes each runtime object only once, regardless of how many times the runtime object is referenced by other objects.

In an embodiment, serialization and deserialization use techniques described in the non-patent publications "The Java™ Tutorials: Java Naming and Directory Interface: Java Objects in the Directory: Serializable Objects," "Discover the secrets of the Java Serialization API," and "Essentials of the Java Programming Language, Part 2: Lesson 4: Serialization," which are commonly owned by the assignee of this application, attached hereto as appendices, and incorporated herein by reference in their entirety.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 7A-7B illustrate example listings of source code according to an embodiment.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
  2. ARCHITECTURAL OVERVIEW
    2.1 EXAMPLE CLASS FILE STRUCTURE
    2.2 EXAMPLE VIRTUAL MACHINE ARCHITECTURE
    2.3 LOADING, LINKING, AND INITIALIZING
  3. PERFORMING CONSTRUCTOR ACCESSIBILITY CHECKS FOR DESERIALIZATION
    3.1 PREVENTING A SERIAL BACKREF ATTACK
    3.2 ILLUSTRATIVE EXAMPLE
  4. EXAMPLE SOURCE CODE FRAMEWORK

5. MISCELLANEOUS; EXTENSIONS
6. HARDWARE OVERVIEW
7. COMPUTER NETWORKS AND CLOUD NETWORKS

1. General Overview

One or more embodiments include techniques for performing constructor accessibility checks during deserialization. A system receives a command that requires deserializing a serialized object of a target type. The system determines an ancestor type of the target type. Without calling any constructors and regardless of whether the ancestor type is serializable, the system determines whether a constructor of the ancestor type is accessible to the target type. The system deserializes the serialized object only after determining that the constructor of the ancestor type is accessible to the target type.

One or more embodiments described in this Specification and/or recited in the claims may not be included in this General Overview section.

2. Architectural Overview

Figure 1:
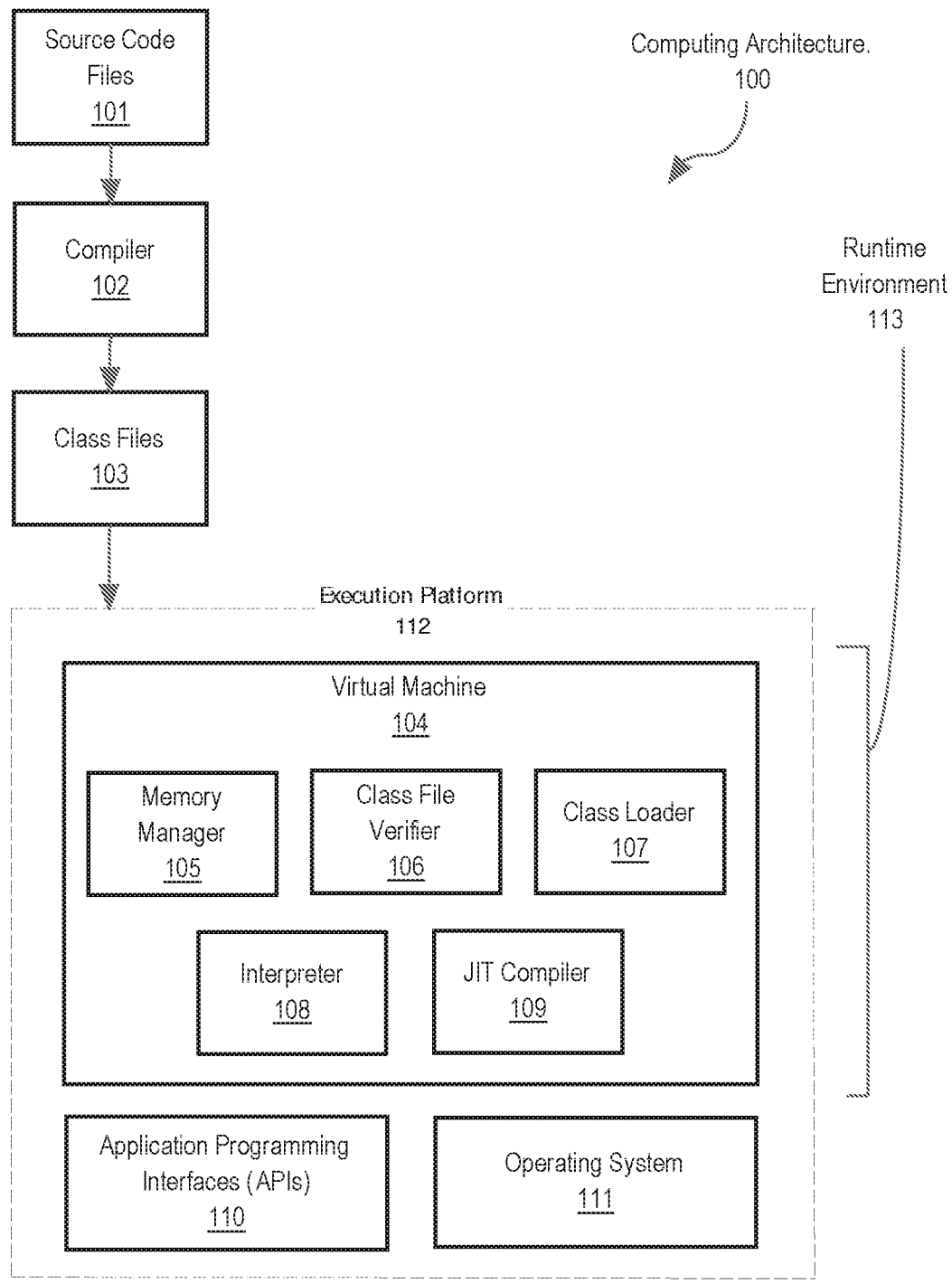
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the logical, human-readable, function-driven form used by the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code (i.e., without additional processing required to determine which data structures to use and which steps to use of those available to the virtual machine). Converting source code to virtual machine instructions includes mapping source code functionality from the language to virtual machine functionality that utilizes underlying resources, such as data structures. Often, functionality that is presented in a logical, human-readable, function-driven form via source code by the programmer is converted into more complex machine-centric steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code avoids this cost penalty at run-time to improve run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. In many dynamic languages (such as Java), the language is designed to allow code to be inserted during the program's execution such that compilation ahead-of-time can lead to inefficiencies. When a program is interpreted, the code of the program is read line-by-line and converted to machine-level instructions while the program is executing. As a result, the program has a shorter startup time (as compared with code that is loaded and compiled in full before execution begins, since it can begin executing without the delay of loading and compiling in full), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. In some examples, programs spend a disproportionate amount of time executing a small portion of a larger body of executing code. For this reason, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In one example, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

In the following example, each of the class files 103 represents a respective "class" defined in the source code files 101 (or dynamically generated by the compiler 102/virtual machine 104). However, in other examples, the class file may represent multiple classes, depending on a variety of factors. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
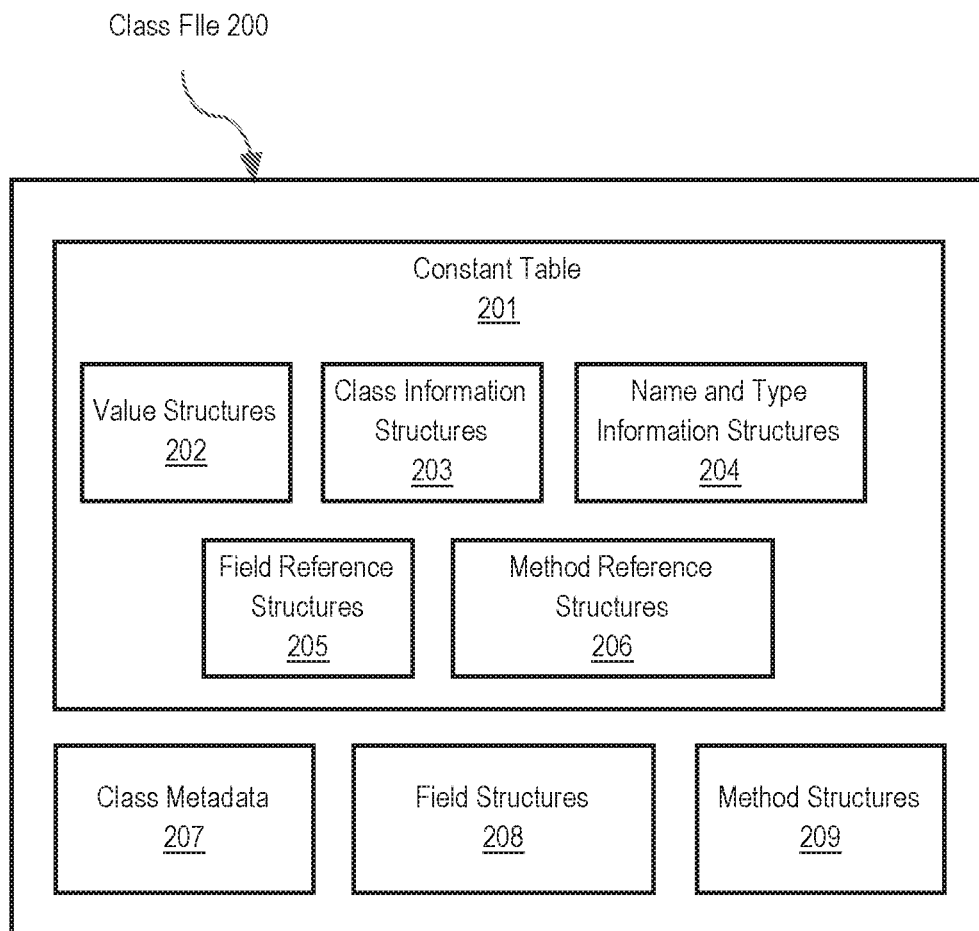
FIG. 2 is a block diagram illustrating an embodiment of a computer system suitable for implementing methods and features described herein.

FIG. 2 illustrates an example structure for a class file 200 in block diagram form according to an embodiment. In one example, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. A symbol table is a data structure that stores information about each symbol (i.e., identifier) that appears in source code. In a class file 200, the constant table 201 stores information about identifiers that appear in the source code for that class. A linker may rely on entries in the constant table 201 to resolve the identifiers. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth. In object-oriented programming, a subclass is a class that extends another class, which is referred to as its superclass. A subclass inherits functionality of its superclass, such as fields, methods, access modifiers, etc. In addition, a subclass may introduce additional functionality and/or override functionality inherited from a superclass. A system of superclasses and subclasses may be referred to as an inheritance hierarchy or "tree." A superclass may be referred to as a "parent" or "ancestor" class of a subclass, and a subclass may be referred to as a "child" or "descendent" class of a superclass.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the base name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParamelerDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, accesses to constant values are shown in the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addtwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 supports a variety of run-time environments, regardless of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
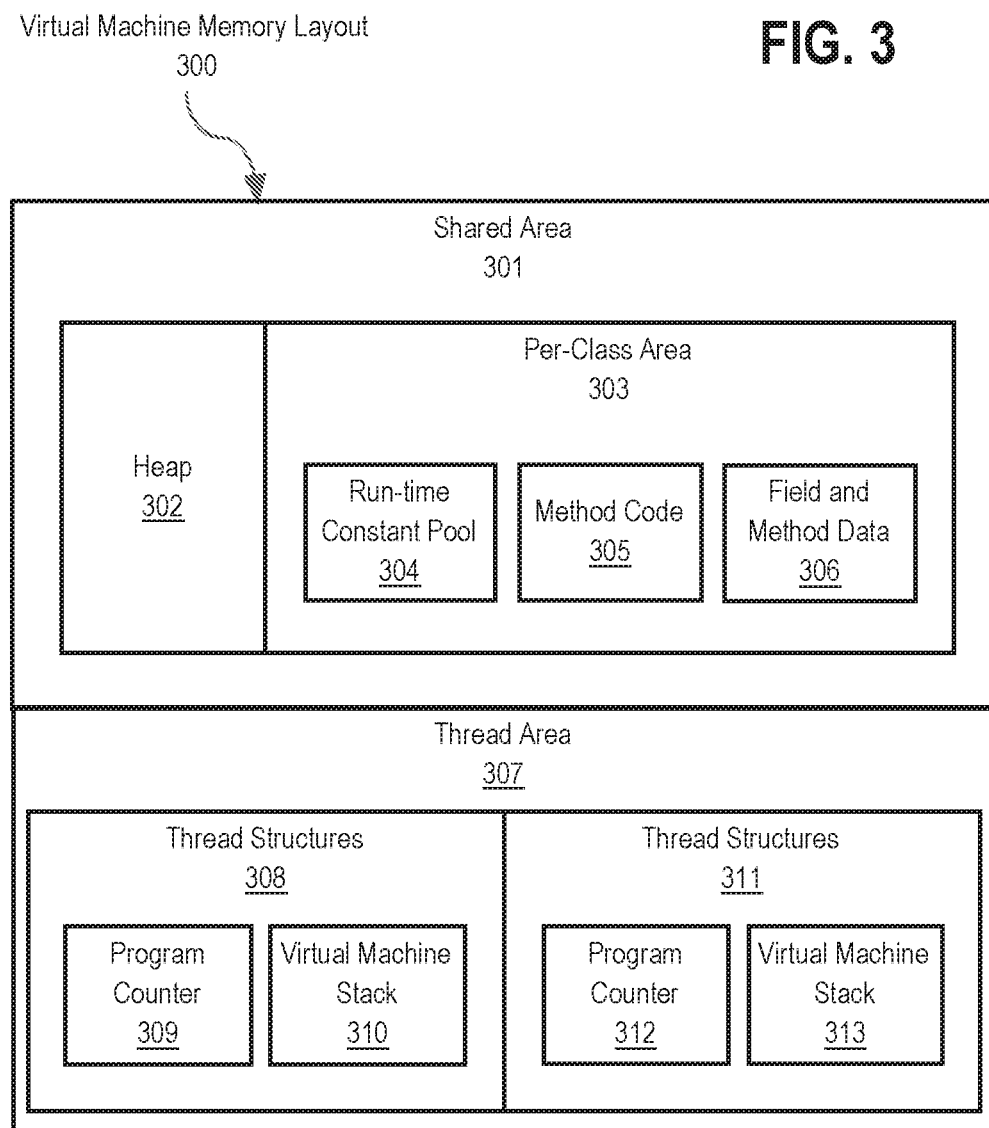
FIG. 3 illustrates an example virtual machine memory layout in block diagram form according to an embodiment.

FIG. 3 illustrates an example virtual machine memory layout 300 in block diagram form according to an embodiment. In one example, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In one example, the thread area 307 depicted in FIG. 3 assumes two threads are executing on the virtual machine 104. However, in a practical environment, the virtual machine 104 may execute any number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
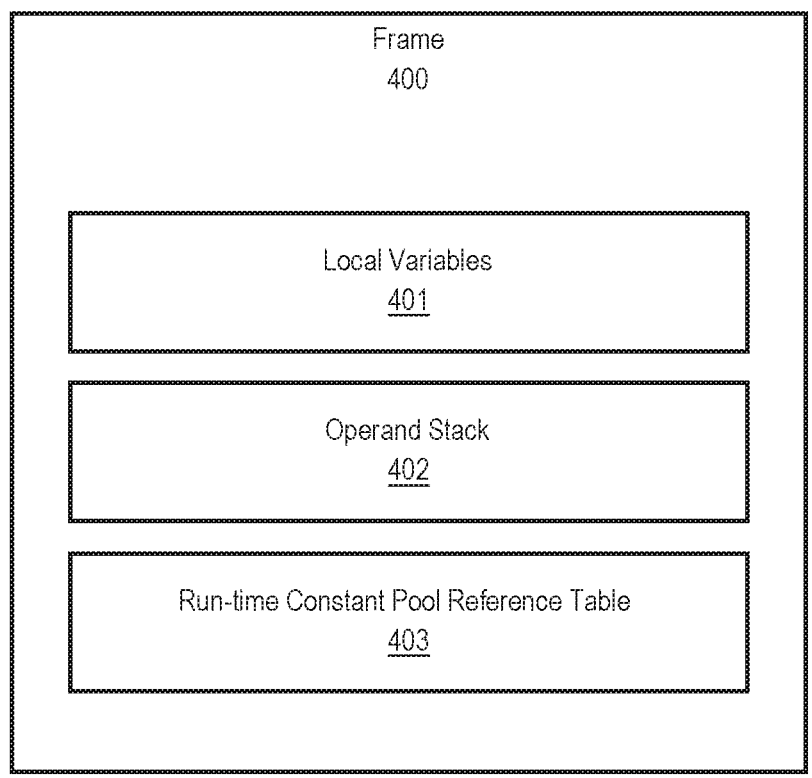
FIG. 4 illustrates an example frame in block diagram form according to an embodiment.

FIG. 4 illustrates an example frame 400 in block diagram form according to an embodiment. In the remaining examples, frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses. For symbols that reference other classes, the resolution mechanism may load classes as necessary to resolve symbols that have not yet been defined or resolved. In addition, the resolution mechanism translates variable accesses into appropriate offsets into storage structures associated with the run-time locations of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily" or on an as-needed basis) one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class (i.e., the class currently under evaluation by the class verification mechanism, when such mechanism is in place and running, as it traverses through evaluation of different classes) has correct access permissions for classes/fields/structures referenced in the constant pool 304, check that the virtual machine 104 code of methods will not cause unexpected behavior based on an expressed form of preferences by the programmer, in code, as the code was initially written (e.g., making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution on an as-needed basis, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Performing Constructor Accessibility Checks for Deserialization

In some cases, a runtime environment may encounter a serialized object that was not, when generated, subject to one or more type restrictions enforced by that runtime environment. As one example, the serialized object may have been "synthesized," i.e., generated using one or more tools that generate the serialized object without ever instantiating the object within the runtime environment. As another example, a different implementation of a runtime environment (e.g., different implementations by different vendors), or a different version of a runtime environment by the same vendor, with one or more different type restrictions, may have generated the serialized object. Many different circumstances may arise where a runtime environment may encounter a serialized object that was not, when generated, subject to one or more type restrictions enforced by that runtime environment.

When a runtime environment encounters a serialized object that was not, when generated, subject to one or more type restrictions enforced by that runtime environment, there is a risk that the serialized object, when deserialized, would be of a prohibited type. A type may be prohibited, for example, if it could not be compiled and/or instantiated, if written into source code by a user, in the absence of the serialization/deserialization mechanisms. A type defines the values that may be stored in association with an identifier (e.g., a runtime variable) and the operation(s) that may be performed on those values. For example, the Java programming language supplies a system of types that includes basic types (also referred to as "primitive types"), objects that are instances of classes (either system classes or user-defined classes), interfaces, and arrays. Object types exists in a class hierarchy that is enforced by inheritance relationships and access restrictions among the different classes. An object may be of a prohibited type when the type, if instantiated, would rely on one or more inheritance relationships that is/are prohibited by access restrictions declared by other types in the class hierarchy. For example, in a Java environment, this would be evident in example classes A and B, where all of the constructors in class A are declared as "private." Constructors are methods that are called when a type is instantiated and establish the instance's (i.e., object's) initial state. Class B does not have access to class A's constructors and therefore cannot extend class A. If a programmer were to attempt to compile code in which class B extends class A, the compiler would refuse to compile the code. Many other circumstances exist where one type is prohibited from extending another type.

As another example, the Java Application Programming Interface (API) includes the class java.net.InetAddress (hereinafter "InetAddress"), of which each instance represents a particular Internet Protocol (IP) address. InetAddress is a public class in an exported package and therefore accessible to code in other classes. However, InetAddress does not have any public constructors and cannot be extended outside of the java.net package. Any type that extends InetAddress outside of the java.net package would be considered a prohibited type.

If a serialized object was not, when generated, subject to one or more type restrictions enforced by the runtime environment in which the object is sought to be deserialized, the object may not have been exposed to the appropriate access checks to prevent the prohibited type, either at compile-time or runtime. In the example above using class A and class B, the serialized object, when deserialized, may be of a type corresponding to the prohibited type B that extends type A. Deserializing an object that is of a prohibited type may result in unexpected system behavior and/or security vulnerabilities. For example, deserializing an object that is of a prohibited type may allow access to functionality, in code, for which a programmer who initially coded the functionality did not directly allow such access but for which access was obtained using a more general knowledge about the structure of the code. In the example above, an object of type B may be able to access data and/or operations of type A that were intended to remain private.

Figure 5:
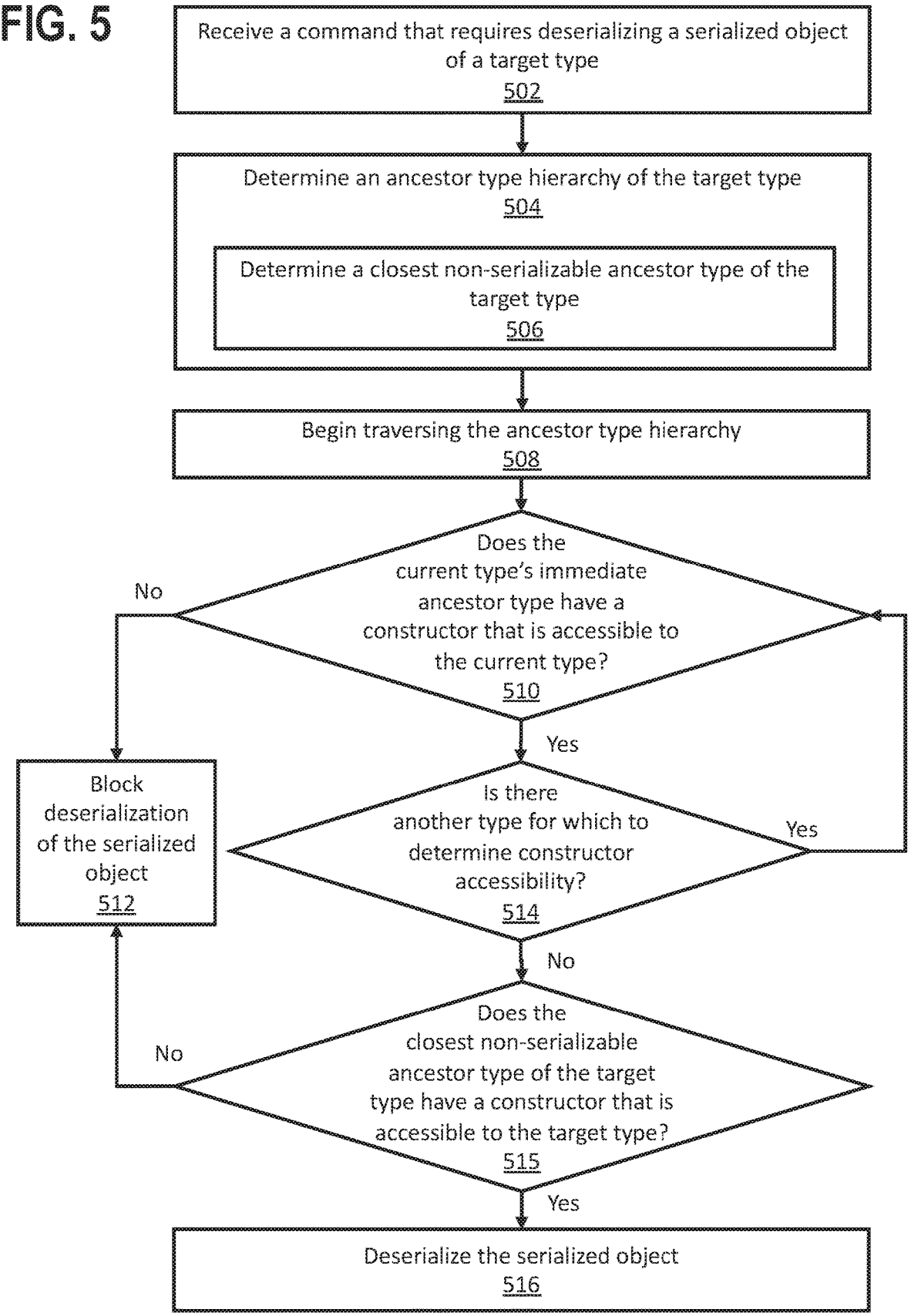
FIG. 5 illustrates a set of operations for performing constructor accessibility checks for deserialization.

In an embodiment, a system performs constructor accessibility checks to avoid deserializing prohibited types. FIG. 5 illustrates an example set of operations for performing constructor accessibility checks for deserialization in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

In an embodiment, a runtime environment receives a command that requires deserializing a serialized object (Operation 502). The type that the serialized object would have, when deserialized, may be referred to as the "target type." The runtime environment encounters the command at runtime. In a Java environment, a virtual machine may encounter the command in bytecode, at runtime.

In an embodiment, responsive to the command that requires deserializing the serialized object, the runtime environment determines an ancestor type hierarchy of the target type (Operation 504). The ancestor type hierarchy is a hierarchy of the types that must be inspected to determine whether the target type is permitted or prohibited. In an embodiment, the runtime environment performs operations to explicitly determine the ancestor type hierarchy, before inspecting types in the hierarchy. For example, the runtime environment may determine the target type's superclass, then determine that class's superclass, and so on, until reaching a furthest, first, top-level, or root ancestor type of the target type. In a Java environment, the "Object" type may be considered the furthest, first, top-level, or root ancestor type. Alternatively, the runtime environment may traverse some or all of the hierarchy, as described below, without first performing operations to explicitly determine the ancestor type hierarchy.

In an embodiment, not all types in the ancestor type hierarchy are serializable. Determining the ancestor type hierarchy of the target type may involve determining a closest non-serializable ancestor type of the target type (Operation 506), to be used in deserialization as described in further detail below. For example, in a Java environment, an object is serializable when it is of a type that either implements the java.io.Serializable interface or has a superclass that is serializable. The logic for whether a class is serializable is recursive, with each superclass being serializable until a non-serializable superclass is reached.

In an embodiment, the runtime environment begins traversing the ancestor type hierarchy (Operation 508). The runtime environment may traverse the ancestor type hierarchy bottom-up (i.e., starting from the target type) or top-down (i.e., starting from a furthest removed ancestor in the ancestor type hierarchy). While traversing the ancestor type hierarchy, the runtime environment determines constructor accessibility for each type encountered that has an immediate ancestor type (i.e., a type immediately 'above' that type in the ancestor type hierarchy). A type that has an immediate ancestor type may be referred to as a 'child' type. For purposes of this discussion, a child type for which the runtime environment is currently determining constructor accessibility may be referred to as the "current type." In an embodiment, the runtime environment determines whether the current type's immediate ancestor type has a constructor that is accessible to the current type (Operation 510).

In one example, a class ancestry type hierarchy may follow the pattern: A←B←C←D, where A is the furthest removed ancestor type and D is the target type. In this example, B is a subtype of A, C is a subtype of B, and D is a subtype of C. Types B, C, and D are child/descendent types. When type D is the current type, the runtime environment determines whether type C has a constructor that is accessible to type D. Type C may have multiple constructors. In an embodiment, the determination succeeds as long as type C has at least one constructor that is accessible to type D, even if one or more other constructors are not accessible to type D. When type C is the current type, the runtime environment determines whether type B has a constructor that is accessible to type C. When type B is the current type, the runtime environment determines whether type A has a constructor that is accessible to type B. Because type A is not a child type, the runtime environment does not need to determine constructor accessibility for type A.

In an embodiment, the runtime environment uses reflective operations to determine whether an ancestor type has a constructor that is accessible to the current type. In general, a reflective operation examines a type (or an instance thereof) to identify its properties, such as: members (fields, methods, etc.); access modifiers applicable to members and/or to the type as a whole; module membership; etc. For example, in a Java environment, the Java Virtual Machine Specification specifies the access modifiers "private," "protected," "public," and default (without an explicit modifier). In an embodiment, the runtime environment calls one or more reflective operations of the ancestor type to obtain information about the ancestor type's constructors and their corresponding access modifiers and/or module memberships. Based on that information, applying the same accessibility logic that would apply if attempting to compile the current type, the runtime determines whether the ancestor type has at least one constructor that is accessible to the current type. The runtime environment enforces the accessibility logic using reflective operations, without attempting to call any of the ancestor type's constructors. In addition, the constructor accessibility logic is not concerned with whether the ancestor type and/or the current type are serializable. For example, in Java, determining which access modifiers and/or module memberships apply to a particular method does not depend on whether the class implements the java.io.Serializable interface or extends another serializable class. The reflective operations inspect accessibility modifiers without regard to whether the ancestor type is serializable.

In an embodiment, if the ancestor type does not have a constructor that is accessible to the current type (as determined in Operation 510), then the runtime environment blocks deserialization of the serialized object (Operation 512). The absence of an accessible constructor serves as a marker that the serialized object, if deserialized, would be of a type prohibited by the runtime environment. Blocking deserialization helps mitigate the risks associated with such an object. In an embodiment, the runtime environment throws a runtime exception upon blocking deserialization of the serialized object. Alternatively or in addition, the runtime environment may log an error, terminate execution, or take some other action (or combination thereof) to record or otherwise indicate that the runtime environment blocked deserialization of a serialized object.

In an embodiment, if the ancestor type has a constructor that is accessible to the current type (as determined in Operation 510), then the runtime environment continues to traverse the ancestor type hierarchy. In this case, the accessible constructor serves as a marker that the subclass is permitted. The runtime environment determines whether there is another type in the hierarchy for which to determine constructor accessibility (Operation 514). For example, in a bottom-up traversal, the next type would be the immediate ancestor type of the current type, if the immediate ancestor type also is a child type. In a top-down traversal, the next type would be the immediate child type of the current type. If there is another type for which to determine constructor accessibility, then that type becomes the new 'current' type and the runtime environment proceeds to determine whether the new current type's immediate ancestor type has a constructor that is accessible to the new current type (Operation 510).

In an embodiment, the runtime environment determines whether the closest non-serializable ancestor type of the target type has a constructor that is accessible to the target type (Operation 515). Specifically, the runtime environment may require that the closest non-serializable ancestor type have a no-argument constructor that is accessible to the target type. The existence of such a constructor may be necessary to permit deserialization as described below. If no such constructor exists, then the runtime environment may block deserialization of the serialized object (Operation 512). In an embodiment, the runtime environment may determine whether the closest serializable ancestor type of the target type has a constructor that is accessible to the target type before determining whether the current type's immediate ancestor type has a constructor that is accessible to the current type. If the closest serializable ancestor type of the target type does not have a constructor that is accessible to the target type, then the runtime environment may block deserialization of the serialized object without traversing the ancestor type hierarchy to perform additional constructor accessibility checks.

In an embodiment, if all constructor accessibility checks are satisfied, then the runtime environment proceeds to deserialize the serialized object (Operation 516). During deserialization, a deserialization mechanism reads each object's serial byte stream from persistent storage and reproduces the runtime object in memory. If the deserialization mechanism encounters a backref for an object that has already been deserialized, it may replace the backref with a reference to the previously deserialized object. In this manner, the deserialization mechanism reproduces each runtime object only once.

In an embodiment, to deserialize the serialized object, the runtime environment generates an uninitialized instance of the target type. The runtime environment may partly initialize the instance of the target type by calling a no-argument constructor of the closest non-serializable ancestor type of the target type. The runtime environment may then read data from the intermediate ancestor types, if any, without calling any constructors of the intermediate ancestor types. In a Java environment, the virtual machine may use calls to readObject( ) and/or readObjectNoData( ) methods of the intermediate subclasses. Because the runtime environment does not call the intermediate ancestor types' constructors, the runtime environment does not perform the accessibility checks that would typically apply when instantiating a type that extends another type. However, techniques described herein will have already verified that each child type in the ancestor type hierarchy has appropriate access to at least one of its respective supertype's constructors, before generating an uninitialized instance of the target type. The deserialization check mechanism prevents an instance of a prohibited target type from being deserialized in the runtime environment. An attempt to instantiate a prohibited target type may result in a runtime exception, error, termination of execution, or some other action (or combination thereof) associated with blocking deserialization of an object that has a prohibited type, as described above.

In general, in an embodiment, techniques described herein may improve security in the deserialization process and help avoid risks associated with instantiating objects of prohibited types into a runtime environment. In an example where a deserialization process does not validate constructor accessibility before instantiating the target type, the runtime environment might create an object in memory corresponding to an uninitialized or partly initialized instance of the target type. The deserialization mechanism would begin reading data from the intermediate ancestor types. In this scenario, even if an attempt to read data from an intermediate ancestor type fails, such as by throwing an exception from a readObject( ) method, the object remains in memory until it is garbage-collected. Because an uninitialized or partly initialized object is in an ill-defined state, runtime errors, security vulnerabilities, and/or other unknown or unexpected runtime behaviors may occur. Malicious code may gain access to that object before it is garbage-collected, via a serial backref attack (described in further detail below), a finalizer attack, or by some other approach, and potentially inject code (or inject bytes or raw data into the serialized form before deserialization) or otherwise misuse the object. Techniques described herein may help prevent such attacks by performing constructor accessibility checks before the object is ever loaded into memory, and may prevent bypassing the restrictions that were hard-coded into the class being deserialized.

3.1. Preventing a Serial Backref Attack

As noted above, one or more embodiments of the deserialization check mechanism described herein helps prevent a serial backref attack by performing the described check on deserialization. A serial backref attack exploits the object table (used to avoid serializing and deserializing duplicated copies of the same object, as described above) to gain access to an object, where such access would otherwise be prevented by the runtime environment in the absence of the serialization and deserialization mechanisms.

In one example, a serial form of an object A, if deserialized, would be of a type prohibited by the runtime environment. During deserialization, without the deserialization check mechanism described herein, the runtime environment would generate at least an uninitialized instance of object A. At that point, there would be an entry in the object table corresponding to object A. In a serial backref attack, an attacker modifies the byte stream to access object A via the entry in the object table, even if object A is never fully initialized. A serial backref attack may succeed even if the runtime environment identifies, after generating the instance of object A, that object A is of a prohibited type. Specifically, the attacker may manipulate error handling code (e.g., a runtime exception handling mechanism) to access object A via the object table before object A is garbage collected.

In an embodiment, the deserialization check mechanism described herein prevents a serial backref attack by preventing the runtime environment from generating even an uninitialized instance of object A. Without instantiating object A, the runtime environment never creates an entry for object A in the object table, thus avoiding the potential for a serial backref attack.

3.2. Illustrative Example

Figure 6:
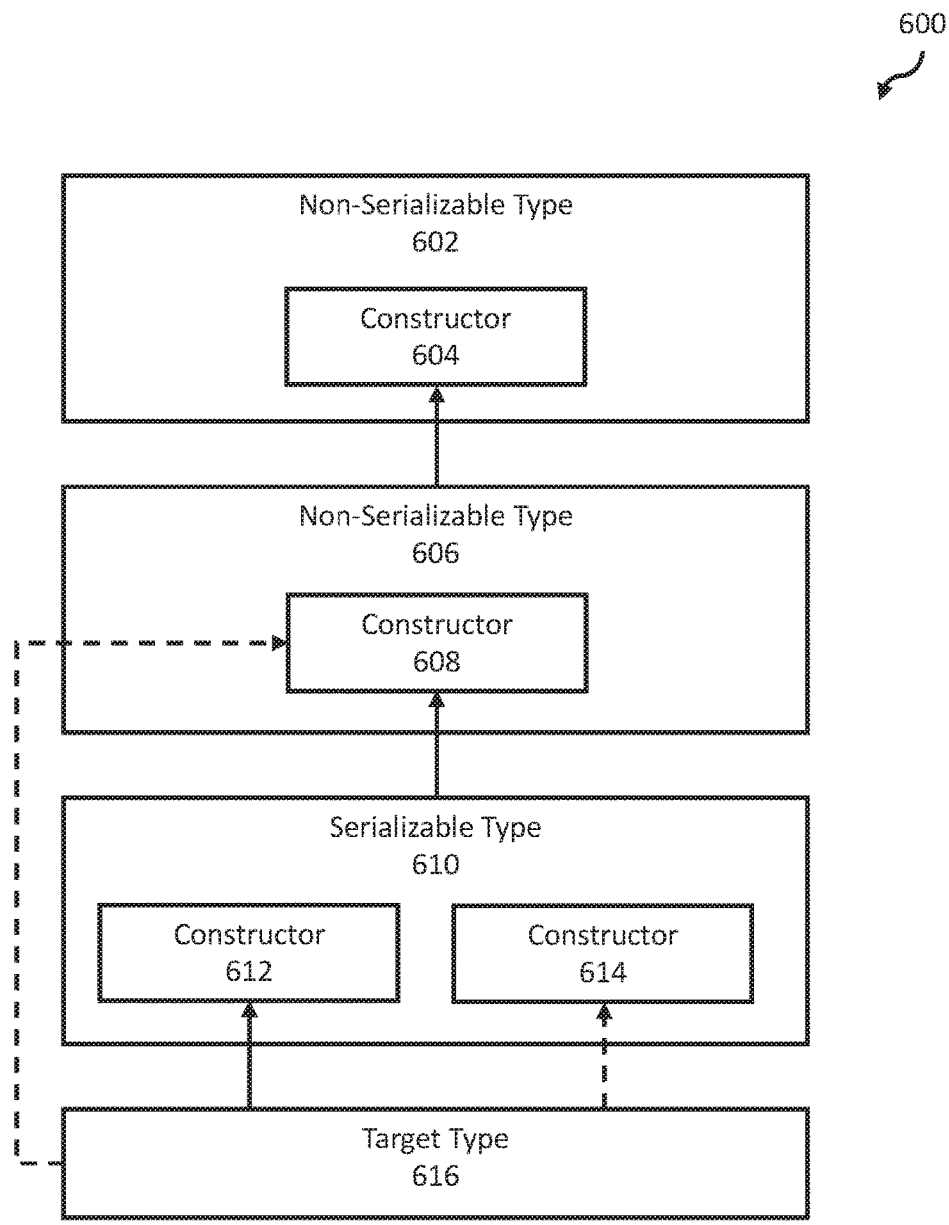
FIG. 6 illustrates a block diagram of an example according to an embodiment.

FIG. 6 illustrates a block diagram of an example according to an embodiment. The example shown in FIG. 6 is provided for illustrative purposes only and should not be construed as limiting one or more embodiments.

FIG. 6 illustrates a type hierarchy 600 that would result if a serialized object of target type 616 were deserialized. In the type hierarchy 600, target type 616 is a subtype of serializable type 610; serializable type 610 is a subtype of non-serializable type 606; and non-serializable type 606 is a subtype of non-serializable type 602. Non-serializable type 602 is the top-level ancestor type. Non-serializable type 606 is the closest non-serializable ancestor type of target type 616. Non-serializable type 606, serializable type 610, and target type 616 are child/descendent types of their respective parent/ancestor types.

Before deserializing a serialized object of target type 616, a runtime environment performs a constructor access check to determine whether the target type 616 is permitted. In this example, the runtime environment performs a bottom-up traversal of the type hierarchy 600, starting with target type 616. The runtime environment determines whether serializable type 610 has at least one constructor that is accessible to target type 616. In FIG. 6, a dashed line represents that constructor 614 is not accessible to target type 616. A solid line represents that constructor 612 is accessible to target type 616. If constructor 612 were not accessible to target type 616, then target type 616 would be prohibited and the runtime environment would block deserialization of the serialized object of target type 616. Because serializable type 610 has at least one constructor that is accessible to target type 616, the runtime environment moves 'upward' in the traversal and determines whether non-serializable type 606 has at least one constructor that is accessible to serializable type 610. A solid line represents that constructor 608 is accessible to serializable type 610. If constructor 608 were not accessible to serializable type 610, then target type 616 would be prohibited and the runtime environment would block deserialization of the serialized object of target type 616.

Because non-serializable type 606 is the closest non-serializable ancestor type of target type 616, the runtime environment also determines whether non-serializable type 606 has at least one constructor that is accessible to target type 616. A dashed line represents that constructor 608 is not accessible to target type 616. Non-serializable type 606 does not have any other constructors. Therefore, target type 616 is a prohibited type. Target type 616 is prohibited even though constructor 604 of non-serializable type 612 is accessible to non-serializable type 606. The runtime environment blocks deserialization of the serialized object of target type 616. By blocking deserialization of the serialized object of target type 616, the runtime environment prevents the prohibited object, which may include malicious and/or malformed code, from gaining access to data and/or operations of serializable type 610, non-serializable type 606, and non-serializable type 602.

4. Example Source Code Framework

FIGS. 7A-7B illustrate example listings of source code according to an embodiment. The source code illustrated in FIGS. 7A-7B may be used as a framework to implement a deserialization check mechanism according to an embodiment. The examples shown in FIGS. 7A-7B are provided for illustrative purposes only and should not be construed as limiting one or more embodiments.

The source code 700 illustrated in FIG. 7A corresponds to a Java-implemented method, superHasAccessibleConstructor. Given a particular class (passed into the method as the parameter "cl"), this method determines whether the given class's superclass has at least one constructor that is accessible from the given class. The method returns the Boolean value true if the given class's superclass does have at least one constructor that is accessible from the given class, and false otherwise. A runtime environment may use this method to perform constructor access checks for a serializable class and its superclasses, up to but not including the first non-serializable superclass. This method depends on the superclass being non-null. In the Java programming language, a serializable type must be a class (not an interface) and the top-level type ("Object") is not serializable.

The source code 702 illustrated in FIG. 7B corresponds to a Java-implemented method, newConstructorForSerialization. Given a particular class (passed into the method as the parameter "cl"), this method returns a constructor that allocates an instance of the given class and then initializes the instance by calling the no-argument constructor of the given class's first non-serializable superclass. See, Java Object Serialization Specification, Section 3.1, in Step 11 of the deserialization process. If the given class is not serializable, then the method returns the given class's no-argument constructor. In some cases, the method may not find an accessible constructor, or the class hierarchy may be somehow malformed. For example, a serializable class may be missing a superclass. If no accessible constructor is found, or the class hierarchy is malformed, the method returns null instead of a constructor.

5. Miscellaneous; Extensions

Embodiments are directed to a system with one or more devices that include a hardware process and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
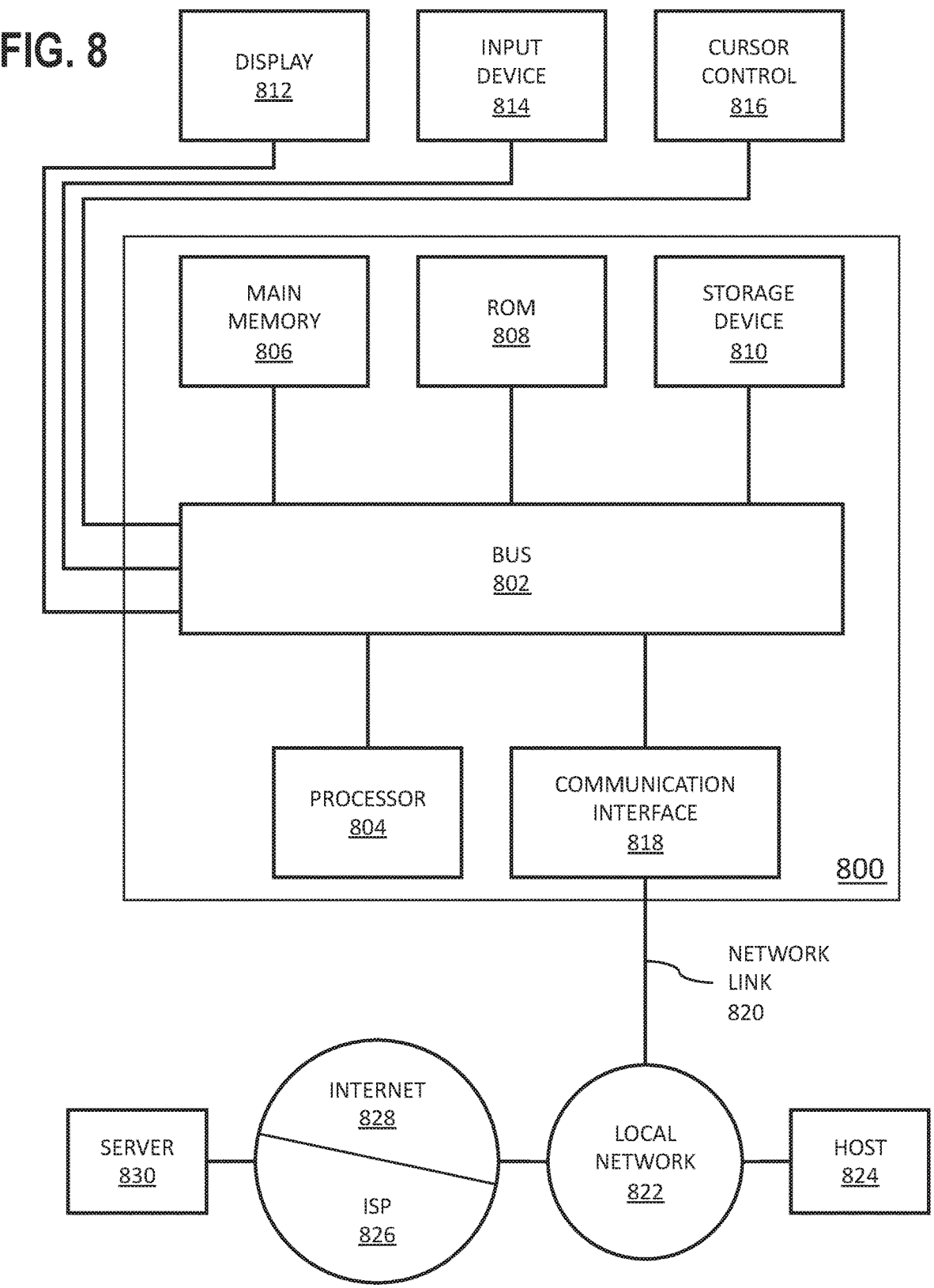
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a liquid crystal display (LCD), plasma display, electronic ink display, cathode ray tube (CRT) monitor, or any other kind of device for displaying information to a computer user. An input device 814, including alphanumeric and other keys, may be coupled to bus 802 for communicating information and command selections to processor 804. Alternatively or in addition, the computer system 800 may receive user input via a cursor control 816, such as a mouse, a trackball, a trackpad, a touchscreen, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. The display 812 may be configured to receive user input via one or more pressure-sensitive sensors, multi-touch sensors, and/or gesture sensors. Alternatively or in addition, the computer system 800 may receive user input via a microphone, video camera, and/or some other kind of user input device (not shown).

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 800 can receive the data from the network and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

7. Computer Networks and Cloud Networks

In one or more embodiments, a computer network provides connectivity among a set of nodes running software that utilizes the deserialization checking techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource the provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   receiving a command that requires deserializing a serialized object of a target type;
   determining an ancestor type of the target type;
   determining, without calling any constructors and regardless of whether the ancestor type is serializable, whether a constructor of the ancestor type is accessible to the target type; and
   deserializing the serialized object only after determining that the constructor of the ancestor type is accessible to the target type.

2. The one or more media of claim 1, wherein determining that the constructor of the ancestor type is accessible to the target type comprises:
   traversing an ancestor type hierarchy of the target type; and
   determining, while traversing the ancestor type hierarchy and without calling any constructors, that for each particular child type in the ancestor type hierarchy, respectively, an immediate ancestor type has at least one constructor that is accessible to the particular child type.

3. The one or more media of claim 2, wherein traversing the ancestor type hierarchy is performed in a bottom-up sequence, beginning with the target type.

4. The one or more media of claim 2, wherein the ancestor type hierarchy extends from the target type to a furthest ancestor type of the target type.

5. The one or more media of claim 1, wherein determining whether the constructor of the ancestor type is accessible to the target type comprises performing a reflective operation on the ancestor type.

6. The one or more media of claim 1, wherein deserializing the serialized object comprises calling a constructor of a closest non-serializable ancestor type of the target type, and wherein determining whether the constructor of the ancestor type is accessible to the target type is performed before calling the constructor of the closest non-serializable ancestor type.

7. The one or more media of claim 1, further storing instructions which, when executed by one or more processors, cause:
    determining a closest non-serializable ancestor type of the target type in the ancestor type hierarchy; and
    determining whether the closest non-serializable ancestor type has at least one constructor that is accessible to the target type,
    wherein deserializing the target type is performed only after determining that the closest non-serializable ancestor type has at least one constructor that is accessible to the target type.

8. A system comprising:
    at least one device including a hardware processor;
    the system being configured to perform operations comprising:
    receiving a command that requires deserializing a serialized object of a target type;
    determining an ancestor type of the target type;
    determining, without calling any constructors and regardless of whether the ancestor type is serializable, whether a constructor of the ancestor type is accessible to the target type; and
    deserializing the serialized object only after determining that the constructor of the ancestor type is accessible to the target type.

9. The system of claim 8, wherein determining that the constructor of the ancestor type is accessible to the target type comprises:
    traversing an ancestor type hierarchy of the target type; and
    determining, while traversing the ancestor type hierarchy and without calling any constructors, that for each particular child type in the ancestor type hierarchy, respectively, an immediate ancestor type has at least one constructor that is accessible to the particular child type.

10. The system of claim 9, wherein traversing the ancestor type hierarchy is performed in a bottom-up sequence, beginning with the target type.

11. The system of claim 9, wherein the ancestor type hierarchy extends from the target type to a furthest ancestor type of the target type.

12. The system of claim 8, wherein determining whether the constructor of the ancestor type is accessible to the target type comprises performing a reflective operation on the ancestor type.

13. The system of claim 8, wherein deserializing the serialized object comprises calling a constructor of a closest non-serializable ancestor type of the target type, and wherein determining whether the constructor of the ancestor type is accessible to the target type is performed before calling the constructor of the closest non-serializable ancestor type.

14. The system of claim 8, the operations further comprising:
    determining a closest non-serializable ancestor type of the target type in the ancestor type hierarchy; and
    determining whether the closest non-serializable ancestor type has at least one constructor that is accessible to the target type,
    wherein deserializing the target type is performed only after determining that the closest non-serializable ancestor type has at least one constructor that is accessible to the target type.

15. A method comprising:
    receiving a command that requires deserializing a serialized object of a target type;
    determining an ancestor type of the target type;
    determining, without calling any constructors and regardless of whether the ancestor type is serializable, whether a constructor of the ancestor type is accessible to the target type; and
    deserializing the serialized object only after determining that the constructor of the ancestor type is accessible to the target type,
    wherein the method is performed by at least one device comprising a hardware processor.

16. The method of claim 15, wherein determining that the constructor of the ancestor type is accessible to the target type comprises:
    traversing an ancestor type hierarchy of the target type, and
    determining, while traversing the ancestor type hierarchy and without calling any constructors, that for each particular child type in the ancestor type hierarchy, respectively, an immediate ancestor type has at least one constructor that is accessible to the particular child type.

17. The method of claim 16, wherein traversing the ancestor type hierarchy is performed in a bottom-up sequence, beginning with the target type.

18. The method of claim 16, wherein the ancestor type hierarchy extends from the target type to a furthest ancestor type of the target type.

19. The method of claim 18, wherein the ancestor type explicitly implements a serializable interface.

20. The method of claim 15, wherein determining whether the constructor of the ancestor type is accessible to the target type comprises performing a reflective operation on the ancestor type.

* * * * *

UNITED STATES PATENT AND TRADEMARK OFFICE
CERTIFICATE OF CORRECTION

PATENT NO. : 10,853,110 B2
APPLICATION NO. : 16/227290
DATED : December 1, 2020
INVENTOR(S) : Marks et al.

Page 1 of 1

It is certified that error appears in the above-identified patent and that said Letters Patent is hereby corrected as shown below:

In the Specification

In Column 2, Line 34, delete "embodiment," and insert -- embodiment; --, therefor.

In Column 3, Line 50, delete "C #," and insert -- C#, --, therefor.

In Column 7, Line 44, delete "{ParamelerDescriptor}" and insert -- {ParameterDescriptor} --, therefor.

In Column 8, Line 6, delete "add Two" and insert -- addTwo --, therefor.

In Column 8, Line 11, delete "addtwo "(I I)I"." and insert -- addTwo "(II)I". --, therefor.

In Column 18, Line 54, delete "process" and insert -- processor --, therefor.

In the Claims

In Column 26, Line 36, in Claim 16, delete "type," and insert -- type; --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*